United States Patent Office 3,110,683
Patented Nov. 12, 1963

3,110,683
PROCESS OF INHIBITING CORROSION
Alfred F. Steinhauer and Joseph C. Valenta, Midland, Mich., assignors to The Dow Chemical Company, Midland, Mich., a corporation of Delaware
No Drawing. Filed Sept. 28, 1959, Ser. No. 842,583
2 Claims. (Cl. 252—389)

This invention relates to alkylated halogenated sulfonated diphenyl oxides; i.e. to compounds having diphenyl oxide as a nucleus to which are attached a long-chain alkyl radical, one or two halogens, and one or two sulfonic acid radicals. These compounds are those having the generic formula

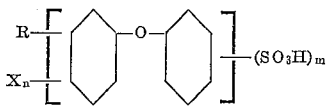

wherein R represents an alkyl radical containing 12 to 22 carbon atoms; X represents a halogen of atomic number 17 to 53, i.e., chlorine, bromine or iodine; and, $m$ and $n$ are integers from 1 to 2; and, salts thereof.

The soluble compounds of the invention are highly surface-active. Thus, the lithium, sodium, potassium, ammonium and most amine salts are readily soluble in water and are useful as detergents, wetting agents, emulsifying and dispersing agents and the like. Many are soluble in petroleum oils and distillates and in various organic fluids. The polyvalent metal salts are substantially insoluble in water but are generally soluble in various organic solvents, including petroleum oils. Solutions in the latter are particularly useful as corrosion inhibitors for ferrous metals as well as being effective oil-soluble surfactants. An especially valuable property of the compounds is their ability to inhibit the growth of many bacteria and fungi. Moreover, the compounds have a strong affinity for surfaces of many materials; hence their inhibitory influence is often long retained by objects that have been contacted with the compounds.

The compounds of the invention may be prepared in a variety of ways. Thus, diphenyl oxide may be alkylated, halogenated and sulfonated in any desired sequence to produce the sulfonic acids. The latter may then be converted to any desired salt thereof by reaction with the appropriate base or salt. Alternatively, either or both of the benzene rings of the diphenyl oxide nucleus may be appropriately alkylated and/or halogenated before being condensed to form the diphenyl oxide nucleus. Some of these methods are illustrated by the following examples.

EXAMPLE 1.—DODECYLDICHLORODIPHENYL OXIDE SULFONATE

Step 1.—Preparation of Dichlorodiphenyl Oxide

Chlorine was sparged into diphenyl oxide containing 1% by weight of ferric chloride, the temperature being maintained at about 40° C., until the increase in weight corresponded to the dichloro ether. The product was then degassed, washed, dried and distilled.

Step 2.—Alkylation of Dichlorodiphenyl Oxide

To 359 grams of dichlorodiphenyl oxide obtained from Step 1 containing 13.85 grams of anhydrous aluminum chloride there was added dropwise with stirring 168 grams of tetrapropylene, the temperature being maintained at 60–63° C. Stirring was continued for one hour after the addition was complete, after which the reaction mixture was cooled, washed with water and distilled at 0.8 mm. pressure.

Step 3.—Sulfonation of Alkyldichlorodiphenyl Oxide

One tenth mole of dodecyldichlorodiphenyl oxide obtained from Step 2 was dissolved in 200 ml. of methylene chloride. The solution was maintained at 9°–17° C. while a solution of 10.4 grams of sulfur trioxide in 75 ml. of methylene chloride was slowly added with stirring. Fifteen minutes after the addition was complete, 350 ml. of water was added with stirring and the mixture was then neutralized with 50% aqueous sodium hydroxide. The aqueous and organic layers were separated and the latter was dried and the solvent evaporated, thus leaving a solid which was then ground to a tan powder. It was readily soluble in water and ethanol.

Various homologs and analogs of the above product were prepared by substantially the same procedure. Thus, when the tetrapropylene used in Step 2 above was replaced with an equivalent amount of higher olefins containing up to 22 carbon atoms, the corresponding alkyldichlorodiphenyl oxide sulfonates were obtained. They had properties generally similar to those of the dodecyl homolog but were more readily soluble in organic solvents, especially in hydrophobic solvents. When primary-alkyl-substituted products were desired the diphenyl oxide or halogenated diphenyl oxide was alkylated by using the alkanoyl chloride (e.g. lauroyl chloride) and aluminum chloride and then hydrogenating the thus formed acyl diphenyl oxide to the corresponding alkyl derivative.

In another manner of preparing the compounds of the present invention, a halobenzene compound which may contain one to three halogen substituents is mixed or otherwise blended with a phenol (by the term phenol, it is to be understood that this term is inclusive of phenol and halophenol) in the presence of a catalytic amount of copper and/or mercury and a strong alkali and preferably in the presence of an inert organic solvent. The reaction proceeds smoothly at about the reflux temperature of the mixture with production of the desired product and water of reaction. The water of reaction is azeotropically removed from the reaction zone as formed. Upon near completion of the reaction, as evidenced by the substantial cessation of the formation of water of reaction, the temperature of the reaction mixture is raised to about 150°–160° C. for a period of time to complete the reaction. The mixture is thereafter cooled to about 90° C., filtered while hot, water added and permitted to stand, whereupon aqueous and organic layers form. The desired product is obtained from the organic layer and is employed in the preparation of the alkylhalodiphenyl oxide by alkylation with an olefin in the presence of anhydrous aluminum chloride. The reaction mixture upon completion of the latter reaction mixture separates into 2 layers, i.e., organic and aqueous. The desired product is again removed from the organic layer and employed in the sulfonation step to prepare the alkylhalodiphenyl oxide sulfonate. The sulfonation may be carried out employing sulfur trioxide or oleum and is preferably carried out by employing sulfur trioxide in an inert solvent, such as methylene chloride or perchloroethylene.

EXAMPLE 2.—SODIUM 4-CHLORO-4′-DODECYLDIPHENYL OXIDE SULFONATE

Step 1.—Preparation of 4-Chlorodiphenyl Oxide 1700 grams (8.9 moles) of 1-bromo-4-chlorobenzene was mixed with 740 grams (7.85 moles) of phenol and one-half gram of mercury, and dispersed in 150 ml. of toluene containing 10 grams of copper bronze powder. The resulting mixture was heated to the reflux temperature (130° C.) and 380 grams of potassium hydroxide added slowly. The water of reaction was azeotropically distilled and removed from the reaction zone. When most of the water of reaction had been removed the major portion of the benzene remaining was also removed and the temperature of the reaction mixture was raised to 150° C. for 2 hours and then to 160° C. for 1 hour. Thereafter, the mixture was cooled to about 90° C. and water added to dissolve the salts which had formed. Filter-aid was added, the mixture was filtered hot and the filtrate permitted to separate into a water layer and an organic layer. The water layer was separated and washed with ethylene dichloride and the extract added to the organic layer. The organic layer was fractionally distilled under reduced pressure to obtain a 4-chlorodiphenyl oxide product boiling at 133°–139° C. at 5 mm. pressure.

*Step 2.—Preparation of 4-Chloro-4'-Dodecyldiphenyl Oxide*

76.6 grams (0.375 mole) of 4-chlorodiphenyl oxide prepared in the manner of Step 1 and 3.6 grams of anhydrous aluminum chloride were mixed together and heated to 60° C. While maintaining this temperature, 42.0 grams (0.25 mole) of tetrapropylene were added slowly, portionwise, over a one-hour period. Upon completion of the addition, the reaction mixture was heated for an additional hour with stirring. Thereafter, the reaction mixture was diluted with an equal volume of water and, upon standing, the reaction mixture separated into two layers. The aqueous layer was separated and discarded; the organic layer washed with a 10% aqueous solution of $NaHCO_3$, then with water-methylene chloride solution, and subsequently dried over $CaCl_2$. The resulting product was fractionally distilled under reduced pressure to obtain a 4-chloro-4'-dodecyldiphenyl oxide product having a boiling range of 190°–235° C. at 5 mm. pressure.

*Step 3.—Preparation of 4-Chloro-4'-Dodecyldiphenyl Oxide Sodium Sulfonate*

5.2 grams (0.065 mole) of $SO_3$ dissolved in 50 ml. of methylene chloride were added with stirring over a 15-minute period to 18.65 gram (0.05 mole) of the product of Step 2 dissolved in 100 ml. of methylene chloride. The temperature was maintained at 23° C. throughout the addition by external cooling of the reaction vessel in an ice-water bath. The stirring was continued for an additional 15 minutes, after which 150 ml. of water was added and the reaction mixture neutralized to pH 7.0 by adding sodium hydroxide. The entire mixture was oven-dried at 100° C. and thereafter extracted with 1 liter of absolute ethyl alcohol and the alcohol evaporated from the extract to obtain a sodium 4-chloro-4'-dodecyldiphenyl oxide sulfonate product as an off-white solid having a softening range of 120°–135° C.

EXAMPLE 3.—PREPARATION OF COMMERCIAL SODIUM 4-CHLORO-4'-DODECYLDIPHENYL OXIDE SULFONATE

*Step 1.—Preparation of 4-Chlorodiphenyl Oxide*

680 grams (4 moles) of diphenyl oxide and 7 grams of fine steel wool were placed in a reaction vessel which was provided with an external cooling means. The entire reaction vessel and cooling bath were covered to exclude light. Chlorine gas was bubbled through the reaction mixture until the specific gravity reached 1.18. During the addition of the chlorine gas, the reaction mixture was maintained at a temperature of about 40° C. Susbequently air was blown through the reaction mixture to remove the excess chlorine and HCl. The crude product was washed with 10% sodium bicarbonate solution and then with water. It was then diluted with an equal volume of methylene chloride, dried over calcium chloride, filtered and distilled under reduced pressure. As a result of these operations there was obtained 265 grams of product boiling at 136° C.±3° C. at 5 mm. pressure. The product consisted of a mixture of 12% of 2-chlorodiphenyl oxide and 88% of 4-chlorodiphenyl oxide.

*Step 2.—Preparation of 4-Chloro-4'-Dodecyldiphenyl Oxide*

Employing the reaction product of Step 1 above in the manner of Step 2 of Example 2 to alkylate the product there is obtained a 4-chloro-4'-dodecyldiphenyl oxide product (containing 12% 2-chloro derivatives) boiling at 184°–188° C. at 1.1–1.6 mm. pressures.

*Step 3.—Preparation of Sodium 4-Chloro-4'-Dodecyldiphenyl Oxide Sulfonate*

Employing the procedure of Step 3 of Example 2, the product of Step 2 above was sulfonated to obtain a sodium 4-chloro-4'-dodecyldiphenyl oxide sulfonate product (containing 12% 2-chloro derivative) as a light tan crystal having a softening point of 120°–135° C.

In the manner of the Example 3, employing appropriate starting materials, sodium pentadecylchlorodiphenyl oxide sulfonate was obtained as a paste having a softening point of 56–60° C.

EXAMPLE 4.—SULFONATION OF THE ALKYLATED CHLORODIPHENYL OXIDE WITH 20 PERCENT OLEUM

One-tenth mole of 4-chloro-4'-dodecyldiphenyl oxide (88% 4-chloro and 12% 2-chloro isomer) and 100 ml. of methylene chloride were placed in a cooled reaction zone with a stirrer; 50 grams of 20% oleum was slowly added portionwise over a period of 15 minutes with stirring and at a temperature of 18°–25° C. Stirring was continued for an additional 15 minutes. Thereafter the reaction mixture was permitted to settle and formed an organic layer above the unused acid which later was removed. The organic layer was dropped into 150 milliliters of water and neutralized with 30 percent aqueous caustic to a pH 7.0–7.5. The mixture was permitted to settle and the organic lower layer recovered and dried. The sodium 4-chloro-4'-dodecyldiphenyl oxide sulfonate product (containing 12% of the 2-chloro isomer) was an off-white color and had a softening point of 104°–107° C.

In the manner of Example 3, employing the appropriate starting compounds, other haloalkyldiphenyl oxide sulfonate salts may be prepared as for example, the sulfonates of docosylchlorodiphenyl oxide, eicosylchlorodiphenyl oxide, dodecylbromodiphenyl oxide, tetradecylbromodiphenyl oxide, dodecyliododiphenyl oxide, and the like.

EXAMPLE 5.—SODIUM 4-CHLORO-4'-DODECYLDIPHENYL OXIDE DISULFONATE

*Step 1.—Preparation of 4-Chlorodiphenyl Oxide*

2375 pounds of diphenyl oxide and 22.7 pounds of anhydrous ferric chloride were placed in a reaction vessel which was provided with an external cooling means. The entire reaction vessel and cooling bath were covered to exclude light. Chlorine gas was bubbled through the reaction mixture until the specific gravity reached 1.203. During the addition of the chlorine gas the reaction mixture was continuously stirred and the reaction temperature was maintained at about 40° C. Subsequently air was blown through the reaction mixture to remove the excess chlorine and HCl. The crude product was washed with 13 pounds of sodium carbonate as an aqueous solution and then with water. It was then diluted with an equal volume of methylene chloride, dried over calcium chloride, filtered, and the solvent distilled to obtain 2768 pounds of crude product. 82 pounds of this crude product was distilled under reduced pressure to obtain 45.3 pounds of product boiling at 124–134° C. at 3.3 mm. pressure. The product consisted of a mixture of 17% of 2-chlorodiphenyl oxide and 83% of 4-chlorodiphenyl oxide.

*Step 2.—Preparation of 4-Chloro-4'-Dodecyldiphenyl Oxide*

511 grams of chlorodiphenyl oxide prepared in the manner of Step 1 and 22.3 grams of anhydrous aluminum chloride were mixed together and dry hydrogen chloride bubbled into the mixture for 5 minutes. Thereafter the reaction vessel and contents were heated to 60° C. While maintaining this temperature, 280 grams of tetrapropylene were added slowly, portionwise, over a one-hour period. Upon completion of the addition, the reaction mixture was heated for an additional 2 hours with stirring. Thereafter, the reaction mixture was agitated with an equal volume of 30% sodium hydroxide solution. Upon standing, the reaction mixture separated into two layers. The aqueous layer was separated and discarded while the organic layer was washed with a 10% aqueous solution of $NaHCO_3$ and then with water-methylene chloride solution and subsequently dried over $CaCl_2$. After distillation of the solvent the resulting crude product (778 grams) was fractionally distilled under reduced pressure to obtain a 4-chloro-4'-dodecyldiphenyl oxide product (17% ortho-chloro and 83% para-chloro) having a boiling range of 170°–180° C. at 1.5 mm. pressure.

In the manner of the Step 2 employing the appropriate starting materials, the following compounds were obtained having the following properties.

ALKYLHALODIPHENYL OXIDES

Boiling temperatures
Pentadecylchlorodiphenyl oxide _____ 182–210° C. at .4–.9 mm.
Dodecylbromodiphenyl oxide _____ 200–240° C. at 5 mm.

*Step 3.—Disodium Dodecylchlorodiphenyl Oxide Disulfonate*

37.3 grams of dodecylchlorodiphenyl oxide was dissolved in 500 grams of methylene chloride and then cooled in an ice bath to below 27° C. There was added a solution of 20 grams of sulfur trioxide in 266 grams of methylene chloride with stirring over a period of 15 minutes. After the addition was complete, the reaction mixture was stirred for one-half hour. Thereafter, one-half liter of water was added and the mixture was neutralized with 50% sodium hydroxide. The methylene chloride layer which formed was separated and discarded. The remaining aqueous solution was dried in an oven to obtain a sodium dodecylchlorodiphenyl oxide sulfonate product as a light yellow powder which was found to give a clear solution at concentration of 0.1% and 5% in 7% sodium hydroxide solution and was found to be insoluble in 17% sodium hydroxide solution at either concentration. The 5% solution in 7% sodium hydroxide had a surface tension of 30.3 dynes/cm. The powder had a softening point of above 300° C.

EXAMPLE 6.—SODIUM PENTADECYLCHLORODIPHENYL OXIDE DISULFONATE 22.2 grams (.054 mole) of pentadecylchlorodiphenyl oxide of step 2 of Example 5 was dissolved in 107 ml. of methylene chloride. To this solution there was added 12.86 grams (.161 mole) of sulfur trioxide dissolved in 64 ml. of methylene chloride over a period of 11 minutes with stirring and cooling. It was stirred for an additional 56 minutes. The temperature was maintained at 10–20° C. during the reaction. The reaction mixture was worked up as above to give a light brownish powder which was soluble at 5% concentration in 7% sodium hydroxide and insoluble in 17% sodium hydroxide. The 5% solution had a surface tension of 32.2 dynes/cm.

EXAMPLE 7

Employing dodecylbromodiphenyl oxide of step 2, example 5 and the procedure of step 3 of Example 5 there was obtained a sodium dodecylbromodiphenyl oxide disulfonate having a softening point of 270°–280° C.

By a similar procedure but by use of only half as much sulfur trioxide, sodium dodecylbromodiphenyl oxide sulfonate was prepared. A 0.1% solution of it in water had a surface tension of 32.2 dynes/cm. and an interfacial tension against mineral oil of 1.8 dynes/cm.

It is readily apparent that in the synthesis of the compounds of the invention one may, and usually does, obtain a mixture of cogeneric products wherein the number of alkyl, halogen or sulfonate substituents on the diphenyl oxide nucleus has an average value other than the whole numbers 1 or 2. Thus, a typical product may contain an average of 1.1 alkyl groups, 1.8 halogen atoms and 1.4 sulfonate groups. Such mixtures are in general fully as useful as the pure compounds and are sometimes actually preferred to the latter.

It is likewise apparent that one can make any desired salt from the sulfonic acids of the invention. The acids may be neutralized directly with ammonia, an amine or a soluble metal hydroxide or carbonate. Alternatively, one may convert one salt to another. Thus, to make the magnesium or iron salt, for instance, one may add an aqueous solution of a soluble iron or magnesium salt, such as the chloride or nitrate, to an aqueous solution of an alkali metal or ammonium salt of the sulfonic acid. The magnesium and iron salts of the sulfonic acid, being substantially insoluble in water, are thus precipitated.

The compounds of the present invention have been tested and found to be effective and useful as the active ingredients in corrosion inhibiting compositions. In representative operations, sodium dodecylchlorodiphenyl oxide sulfonate completely prevented rusting and corrosion of a steel plate when applied thereto as a 5%, by weight, solution in kerosene and also in a composition containing 91% mineral spirits, 4% kerosene, 5% lanolin and 1.0% sodium dodecylchlorodiphenyl oxide sulfonate.

This application is a continuation-in-part of copending applications, Serial No. 744,008, filed June 23, 1958, now Patent No. 2,992,999, 735,669 and 735,681, filed May 16, 1958, now abandoned, and 816,061, filed May 27, 1959.

The symbol M is used herein to represent a cation. It is to be understood that wherever M is used, the cation is present in sufficient quantity to satisfy the valence of the sulfonate radical with which it is associated. Thus, in the radical —$SO_3M$, it is to be understood that M represents 1 molar proportion of a mono-valent cation, ½ molar proportion of a divalent cation or ⅓ molar proportion of a trivalent cation.

We claim:

1. The process for inhibiting the corrosion of a ferrous metal by applying to the surface of said metal an effective amount of a compound having the formula

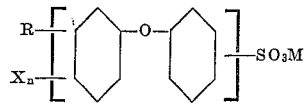

wherein R is an alkyl group containing 12 to 22 carbon atoms; X is a halogen having an atomic number from 17 to 35; $n$ is an integer from 1 to 2; and, M is a cation.

2. The process defined in claim 1 wherein the compound is sodium dodecylchlorodiphenyl oxide sulfonate.

References Cited in the file of this patent

UNITED STATES PATENTS

| | | |
|---|---|---|
| 2,081,876 | Prahl | May 25, 1937 |
| 2,208,162 | Prutton et al. | July 16, 1940 |
| 2,223,363 | Flett | Dec. 3, 1940 |
| 2,249,757 | Flett | July 22, 1941 |
| 2,267,725 | Flett | Dec. 30, 1941 |
| 2,271,635 | Flett | Feb. 3, 1942 |
| 2,388,962 | Flett | Nov. 13, 1945 |
| 2,411,676 | Burghart | Nov. 26, 1946 |
| 2,445,936 | Butcosk | July 27, 1948 |
| 2,583,399 | Wachter | Jan. 12, 1952 |
| 2,713,032 | Tailleur | July 12, 1955 |
| 2,862,847 | Craig | Dec. 2, 1958 |
| 2,875,122 | Kosmin | Feb. 24, 1959 |
| 2,901,438 | Rogers | Aug. 25, 1959 |
| 2,956,956 | Strauss et al. | Oct. 18, 1960 |
| 2,992,999 | Smith et al. | July 18, 1961 |

FOREIGN PATENTS

| | | |
|---|---|---|
| 562,347 | Canada | Aug. 26, 1958 |